United States Patent
Grubb et al.

(10) Patent No.: US 10,461,852 B1
(45) Date of Patent: Oct. 29, 2019

(54) SUBMARINE CABLE NETWORK ARCHITECTURE

(71) Applicant: Facebook, Inc., Menlo Park, CA (US)

(72) Inventors: Stephen Gregory Grubb, Atherton, CA (US); Timothy Edward Stuch, Livermore, CA (US); Andrew James Palmer-Felgate, Chichester (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/057,557

(22) Filed: Aug. 7, 2018

(51) Int. Cl.
*H01B 7/14* (2006.01)
*H04B 10/079* (2013.01)
*G02B 6/44* (2006.01)
*H04B 10/80* (2013.01)

(52) U.S. Cl.
CPC ..... *H04B 10/07955* (2013.01); *G02B 6/4427* (2013.01); *H01B 7/14* (2013.01); *H04B 10/0793* (2013.01); *H04B 10/808* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,442,615 B1 * | 8/2002 | Nordenstam | ......... | H04L 41/142 709/223 |
| 7,388,872 B2 * | 6/2008 | Montgomery, Jr. | .... | H04J 3/085 370/404 |
| 2004/0130215 A1 * | 7/2004 | Muramatsu | ................ | H02J 4/00 307/69 |
| 2008/0310858 A1 * | 12/2008 | Lu | ......... | H04B 10/296 398/158 |
| 2009/0274426 A1 * | 11/2009 | Lail | ....... | G02B 6/4486 385/105 |
| 2010/0316375 A1 * | 12/2010 | Kram | ....... | H04B 3/44 398/25 |
| 2012/0182023 A1 * | 7/2012 | Zhang | ................ | G01M 11/3109 324/501 |
| 2013/0202285 A1 * | 8/2013 | Lecroart | ................. | H04B 3/44 398/1 |
| 2013/0315591 A1 * | 11/2013 | Inoue | .................. | H04J 14/0209 398/48 |
| 2014/0238716 A1 * | 8/2014 | Aussant | .................... | H01R 4/66 174/6 |
| 2016/0164597 A1 * | 6/2016 | Evans | ................. | H04J 14/0221 |
| 2016/0211918 A1 * | 7/2016 | Kamalov | ........... | H04B 10/2575 |
| 2016/0218461 A1 * | 7/2016 | Petie | .................... | H01R 13/523 |
| 2016/0261360 A1 * | 9/2016 | Zhang | ................... | H04J 14/021 |

(Continued)

OTHER PUBLICATIONS

Massimo Tornatore, Availability Design of Optical Transport Networks, IEEE Journal on Selected Areas in Communications, vol. 23, No. 8, Aug. 2005, pp. 1520, 1523-1526.*

*Primary Examiner* — Omar S Ismail
(74) *Attorney, Agent, or Firm* — Van Pelt, Yi & James LLP

(57) ABSTRACT

A system comprises a trunk submarine cable, an offshore optical and power switching unit connected to the trunk submarine cable, and a plurality of feeder submarine cables connected to the offshore switching unit. The offshore switching unit is configured to dynamically connect data communication channels of a selected feeder submarine cable among the plurality of feeder submarine cables with data communication channels of the trunk submarine cable and to reconfigure power in the case of power faults.

20 Claims, 8 Drawing Sheets

(56) References Cited

U.S. PATENT DOCUMENTS

2016/0301467 A1* 10/2016 Ji .......................... H04B 10/032
2016/0308639 A1* 10/2016 Zhang ................. H04J 14/0204
2016/0359554 A1* 12/2016 Hibino ............... H04B 10/0771
2018/0376607 A1* 12/2018 Villmark ................ H05K 5/069

* cited by examiner

SUBMARINE CABLE NETWORK ARCHITECTURE

BACKGROUND OF THE INVENTION

Submarine communications cables are laid in the water, e.g., along the sea floor to provide long-distance communications between continents. These specialized cables are designed to withstand harsh underwater conditions but are still susceptible to faults, such as cuts or electrical power feeding faults resulting in disruption of optical and/or power connectivity. A network fault can potentially bring down network connectivity for weeks or longer and significant effort is required to restore the network's availability. Traditionally, a submarine cable network is designed as a point-to-point network, connecting one onshore network to another via a submarine cable. In many scenarios, however, the network fault is relatively close to shore, for example, within 100 km of shore. Therefore, there exists a need for a submarine cable network architecture that improves network efficiency and resiliency, especially with respect to optical connection and power faults close to shore.

BRIEF DESCRIPTION OF THE DRAWINGS

Various embodiments of the invention are disclosed in the following detailed description and the accompanying drawings.

DETAILED DESCRIPTION

Figure 1:
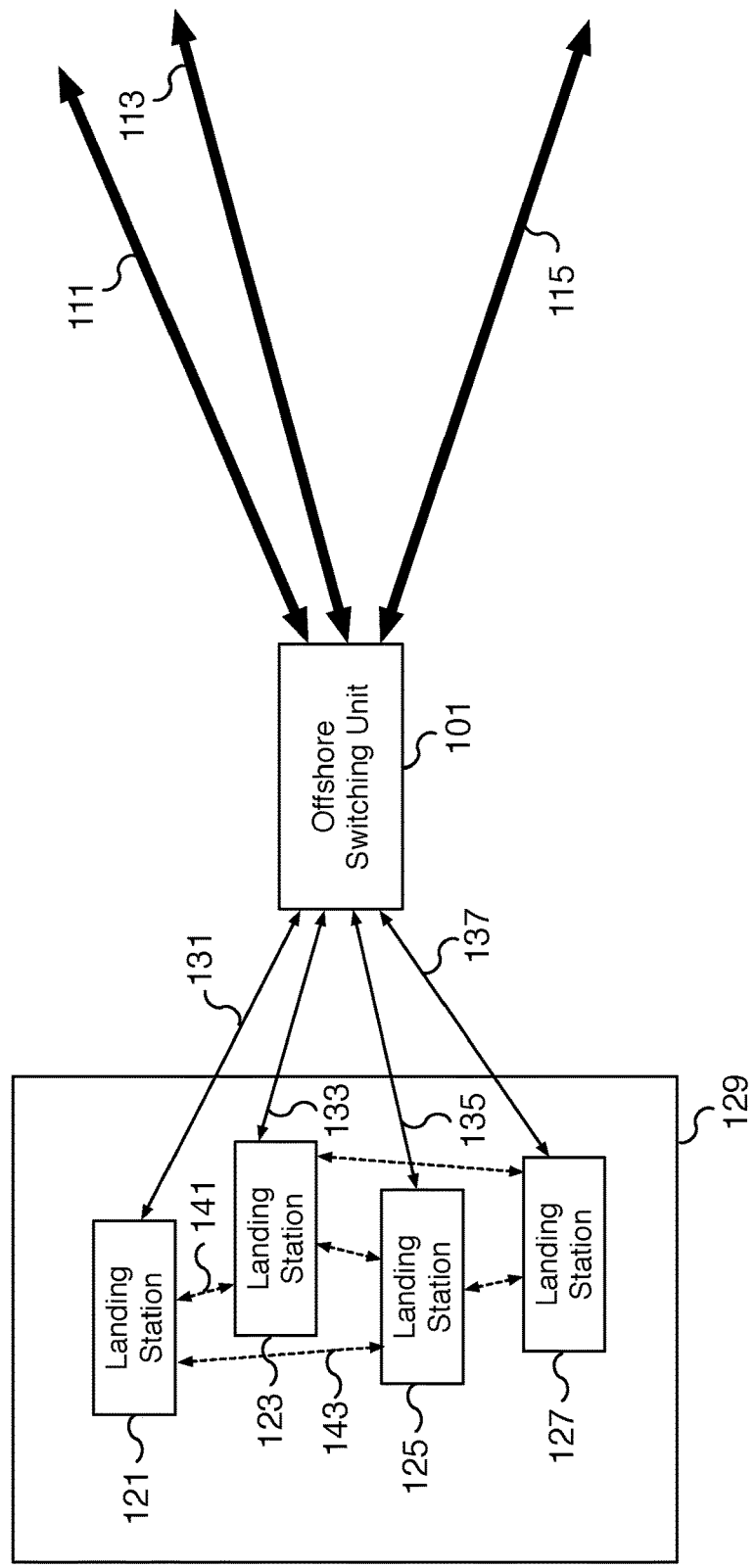
FIG. 1 is a block diagram illustrating an embodiment of a submarine cable network architecture using a disaggregated model.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A submarine cable network architecture using a disaggregated model is disclosed. For example, a submarine cable network is split into separate feeder networks originating from land, e.g., at one or more cable landing stations, and one or more core trunk networks that include deep water submarine cables. In various embodiments, the feeder networks and core trunks are fully interconnected via offshore switching units. The feeder network may be constructed with low cost cables, high fiber counts, and inexpensive and/or different technology repeaters. The probability of faults in the feeder network is generally much greater than in the deep water network. The core trunk networks, located in areas where the probability of faults is greatly reduced, may be constructed with high performance and high capacity cables that exhibit high reliability. Trunk submarine fibers and the associated branching units may be located in areas that do not require governmental permits which are often the limiting factor in the timeframe of how rapidly a new submarine cable can be constructed and deployed. Feeder networks may be in geographies where governmental permission to construct and land are required. These sections of a submarine cable may be built at different points in time and by different parties. At each interconnect, a branching unit such as an offshore switching unit may utilize full optical switching and/or wavelength routing to implement subsea optical switching. Similarly, a branching unit may utilize a power switch branching unit to redirect power. In various embodiments, each interconnect is connected to one or more submarine cables of a core trunk network. Similarly, each interconnect is connected to one or more feeder networks, the feeder networks terminating onshore at multiple cable landing stations. The feeder networks may also have higher fiber count cable. Fibers in this cable may be used to establish direct and switchable connectivity between the landing stations, creating an alternate path to terrestrial interconnections. In the event of an optical connectivity fault, the branching unit can re-route an optical signal using wavelength routing around the fault. For example, in the event the connection from an interconnect to a cable landing station is severed, the offshore switching unit at the interconnect can route the connection to a different cable landing station using a different optical data communication channel. Once a signal arrives at the new cable landing station, the signal can be routed using conventional networking techniques deployed on land to reach the intended final destination. Similarly, in the event of a power failure for a submarine cable occurs, for example, power connectivity is lost, the offshore switching unit at the interconnect can route power connectivity to restore the connection. In some embodiments, due to the high voltage requirements, a new powering scheme is determined by the system and then manually activated after following applicable safety protocols and regulations. In various embodiments, the disaggregated model supports subsea switching of both optical connections and cable powering and is capable of reacting more quickly to both optical connection faults and power faults.

In various embodiments, submarine cables are designed to operate in a subsea environment. In some embodiments, the cables are designed to have an operational life of 25 years or more while submerged. Unlike conventional cables used onshore, deep sea cables must withstand the subsea environment and may be difficult to access for repairs. Repairs may require identifying the location of a faulty section of the cable, travelling by sea to the faulty section, recovering the cable, severing the cable near the fault, recovering each of the severed ends, repairing the damaged cable, sealing the patched cable to prevent water damage, and lowering the repaired cable to the ocean floor. In various embodiments, the repair requires testing the repaired cable and may include reburying the cable. In various scenarios, cables may be hundreds of kilometers long while others can be over ten thousand kilometers long. For example, a transoceanic submarine cable connecting Hong Kong to Los Angeles can be approximately 13,000 kilometers long. As a result of the distance between end points, submarine cables typically require optical amplifiers and/or repeaters to boost signal strength along the route. In various embodiments, a submarine cable includes multiple strands of optical fibers for carrying optical signals. The optical fibers may be encased to increase water-resistance. For example, in some embodiments, the optical fibers may be encased in a water-resistant gel. In some embodiments, the optical fibers are encased in a tube such as a plastic or polyester tube. For example, in some embodiments, a tube made of polybutylene terephthalate (PBT) encases the optical fibers (and optional gel). The tube may function as a barrier to isolate the optical fibers from water penetration, vibrations, and/or thermal extremes. In various embodiments, additional tubing such as a copper or aluminum tube, a polycarbonate encasing, and/or an aluminum water barrier encases the optical fibers and water-resistant casing. In the examples discussed, the copper or aluminum tube within the submarine cable functions as a conductor. In some embodiments, steel wires encase the fibers and provide both protection and weight. For example, strands of steel wires with a high tensile strength running parallel with the optical fibers act as cable strength members and also provide protection against physical damage while allowing for some flexibility. In some embodiments, the stands may be more than one layer of steel wires thick (e.g., two or more layers of steel wires are used). In various embodiments, multiple sets of steel wire strands are used. For example, a double armored cable may include two sets of strands separated by a barrier such as a polyethylene insulation layer. The inner set of strands may utilize steel wires and the outer set of strands may utilize tar-covered galvanized wires. In some embodiments, a barrier layer such as a polyethylene encasing and/or a tar-soaked nylon yarn provides additional protection and serves as an exterior moisture barrier. For example, a thick encasing of high-density polyethylene may serve as the outer encasing of the submarine cable. In some embodiments, one or more additional conductors are included in the submarine cable. For example, a second copper or aluminum conductor runs along the cable outside the inner polyethylene encasing but inside the outer encasing of the cable and can function as an additional conductor for powering electronics such as repeaters. In various embodiments, the current running through an additional conductor can run in the opposite direction of current running through the innermost conductor. In some embodiments, a conductor may operate with voltages between 5 and 15 kilovolts.

In some embodiments, a submarine cable network architecture includes at least a trunk submarine cable, an offshore switching unit, and a plurality of feeder submarine cables. In some embodiments, the feeder submarine cables include at least three or more feeder submarine cables. The offshore switching unit is connected to the trunk submarine cable and the plurality of feeder submarine cables. For example, a transoceanic trunk submarine cable extends from one offshore location to another and at least one of the ends of the trunk submarine cable is connected to an offshore switching unit. The offshore switching unit is also connected to multiple feeder submarine cables that terminate onshore at different cable landing stations. In various embodiments, the offshore switching unit includes a configuration of reconfigurable optical add-drop multiplexers (ROADMs) that utilize wavelength selective switching (WSS) components. In some embodiments, the offshore switching unit is capable of wavelength selection and spectrum switching, whole optical fiber switching, power monitoring, power balancing, and/or power switching. In some embodiments, the trunk submarine cable is a high reliability, high performance, and high capacity cable located in deep water, where the probability of faults is greatly reduced, and the feeder submarine cables are low cost and high fiber count cables that utilize inexpensive repeaters and are located in shallower water, where the probability of faults are much higher. In many scenarios, the feeder submarine cables are more likely to be damaged and/or incur operational faults and should be provisioned in greater quantities than the trunk submarine cables that have a higher reliability and are less likely to fail. The higher number of feeder submarine cables allows for a higher failure rate associated feeder submarine cables. In various embodiments, the ratio of feeder to trunk submarine cables in the submarine cable network architecture is based on the relative failure rates between the two types of cables. These two networks may be constructed by different parties, at different points in time, and may utilize different technologies. In some scenarios, offshore switching units connecting the two networks are placed at a distance offshore based on the relevant countries' territorial waters and/or regulations. For example, offshore switching units may be positioned and/or trunk submarine cables may terminate outside of a country's territorial waters and/or within international waters. For example, terminating trunk submarine cables and/or positioning offshore switching units in international waters minimize the impact of a country's regulations on the installation of the equipment. In some scenarios, it may take three years or more to receive approval for the installation of equipment, such as feeder submarine cables, to be installed in the coastal waters within a country's jurisdiction. During that time, work can progress on the other portions of the submarine cable network architecture. For example, portions of the network equipment outside of a country's jurisdiction can be installed ahead of receiving the approval needed for feeder submarine cables to be located within the territorial waters/coastal regions of a country and that would be subject to that country's laws and/or regulations. In some scenarios, territorial waters and/or a country's regulatory reach may extend up to 200 nautical miles from land. In certain situations, offshore switching units may be positioned and trunk submarine cables may terminate just outside a country's regulatory reach, for example, just outside the 200 nautical mile boundary. In some scenarios, a country's regulatory reach may include multiple zones with different regulatory enforcement and/or rules. The different zones may be based on the distance from its coast or a permanently exposed land. For example, in some scenarios, regulatory impact and/or jurisdiction is defined by differentiating between a country's internal waters, territorial seas, contiguous zone, exclusive economic zone, and/or continental shelf. For example, a country's territorial seas may extend 12 nautical miles from a baseline (such as its coast), a contiguous zone may extend from the edge of the territorial sea to up to 24 nautical miles from the baseline, an exclusive economic zone may extend from the baseline to 200 nautical miles (and thus include the contiguous zone), and a continental shelf for a coastal nation may extend at least 200 nautical miles from the baseline and/or be based on its continental margin. A country's jurisdictional and regulatory impact may differ and be based on which zone a portion of the network equipment resides/impacts. In various embodiments, the placement of different portions of network equipment is based on the relative regulatory and jurisdictional reach of the surrounding countries and their jurisdictional and/or regulatory claims. In various scenarios, the exact number of zones, the exact regions or distances the zones are based on, and the regulatory and jurisdictional power entities have with respect to the zones may differ and/or change over time.

In some embodiments, the offshore switching unit is configured to dynamically connect a data communication channel of a selected feeder submarine cable among the plurality of feeder submarine cables with a data communication channel of the trunk submarine cable. For example, in the event that a feeder submarine cable is severed and optical connectivity is lost along the route, the offshore switching unit dynamically connects a new data communication channel using a selected feeder submarine cable to the original trunk submarine cable. Using the new data communication channel, the network can route around the severed feeder submarine cable. In some embodiments, the connection is based at least in response to a detected reduction in availability of one or more data communication channels of the plurality of feeder submarine cables. For example, the newly configured connection is based on monitoring and detecting a failed data communication channel, for example, caused as a result of a severed feeder submarine cable. In various embodiments, multiple interconnected submarine cables, including feeder and trunk cables, are utilized for subsea switching at an offshore switching unit. At the offshore switching unit, optical and/or power connectivity can be dynamically modified to route around subsea failures. As a result, the submarine cable network architecture is more resilient to connectivity failures.

In some embodiments, the offshore switching unit is configured to dynamically distribute power from a selected feeder submarine cable among the plurality of feeder submarine cables in order to power the trunk submarine cable. For example, in the event a power source is severed and power is lost along a route, the offshore switching unit dynamically redistributes power within the feeder submarine cable to reestablish powering of the trunk submarine cable. The newly established powering scheme is sufficient to power the route. For example, the new power scheme is used to power optical amplifiers and/or repeaters to boost the signal strength along the route until repairs to the power conductor can be made. In some embodiments, the dynamically controlled powering scheme is created based at least in response to a detected reduction in power supply within one or more of the plurality of feeder submarine cables. For example, the offshore switching unit monitors the power supply to one or more feeder submarine cables and the trunk submarine cable. In response to a reduction in the availability of power, a new powering scheme is dynamically connected. In various embodiments, multiple submarine cables are interconnected and can be used to switch and distribute power among them. As a result, the disclosed submarine cable network architecture using a disaggregated model is more resilient to power conductor failures.

In some embodiments, the submarine cable network architecture allows for dual-end and single-end power feeding, automatic power balancing of shunt faults, and/or power switching between segments that are dual-end fed and/or powered to ground at an offshore switching unit. For example, one or more different cable landing stations may be used to power a power line traversing from one cable landing station to another via one or more feeder submarine cables, one or more offshore switching units, and one or more trunk submarine cables. In various embodiments, power can be single-fed or dual-fed by cable landing stations. For example, in the event a shunt fault occurs, power can be dual-fed from both ends of the power connection, creating a path for current to travel from both ends towards the fault and/or location of the new ground created by the fault. In some embodiments, the power can be split via an offshore switching unit in two directions to power a failed power connection. For example, using one of the split connections, an offshore switching unit may be utilized to power a submarine cable with a shunt fault from one end and a cable landing station from the other end. In some embodiments, an offshore switching unit may be utilized to perform a 50/50 power split. For example, for short distances, a 50/50 power split can be used to restore a power connection when a lower voltage, such as 8 kilovolts is adequate.

In some embodiments, the submarine cables, such as the feeder submarine cables, have multiple conductors. For example, a feeder submarine cable includes an additional sheath for a secondary conductor that allows the cable to carry current in both directions. In various embodiments, using submarine cables with an additional conductor allows the cables to be used to feed multiple paths and to accommodate a variety of configurations including asymmetric network configurations and scenarios where many more feeder submarine cables are connected to an offshore switching unit than trunk submarine cables. The availability of additional conductors in a submarine cable allows for the power to be diverted using the second conductor towards a fault, for example, to power a failed power connection from both ends. In some embodiments, feeder submarine cables are configured with multiple conductors while the trunk submarine cables use a single conductor.

In some embodiments, the submarine cable network architecture includes one or more unpowered submarine cables such as unpowered trunk submarine cables. In the event of an optical failure, the unpowered trunk submarine cable may be utilized to carry an optical signal. In various embodiments, the length of each unpowered submarine cable is selected such that an optical signal can be transmitted without the need of repeaters or other similar equipment. For example, in some embodiments, the unpowered trunk submarine cables are limited to a length of approximately 30 to 40 km. In various embodiments, a failed optical connection, such as one caused by a crushed optical fiber, can be restored by bypassing the failure using an unpowered submarine cable. The submarine cable network architecture can route around the optical failure by using existing portions of the powered sections of the connection and the optical transport provided by the unpowered submarine cable(s). In various embodiments, the reconfigured solutions are temporary solutions to restore connectivity until a marine repair can be conducted.

FIG. 1 is a block diagram illustrating an embodiment of a submarine cable network architecture using a disaggregated model. In the example shown, FIG. 1 includes offshore switching unit 101; trunk submarine cables 111, 113, and 115; cable landing stations (CLSs) 121, 123, 125, and 127; and feeder submarine cables 131, 133, 135, and 137. CLS 121, 123, 125, and 127 are located onshore, represented by land region 129. Offshore switching unit 101 is located in or on the water. For example, in some embodiments, offshore switching unit 101 is located under water. In some embodiments, offshore switching unit 101 is located 100 km or more off shore from land region 129. Offshore switching unit 101 is connected to trunk submarine cables 111, 113, and 115. In some embodiments, an offshore switching unit, such as offshore switching unit 101, has only a single trunk submarine cable (not shown). In various embodiments, submarine cables 111, 113, and 115 terminate at one or more different offshore switching units not shown. Offshore switching unit 101 is also connected to CLSs 121, 123, 125, and 127 via feeder submarine cables 131, 133, 135, and 137, respectively. For example, feeder submarine cable 131 connects offshore switching unit 101 to CLS 121 and feeder submarine cable 133 connects offshore switching unit 101 to CLS 123. Additionally, feeder submarine cables 135 and 137 connect offshore switching unit 101 to CLSs 125 and 127, respectively. In various embodiments, onshore landing stations such as CLSs 121, 123, 125, and/or 127 may be connected to one another via traditional onshore network connections. For example, CLS 121 is connected to CLSs 123 and 125 via network connections 141 and 143, respectively. CLS 123 is also connected to CLSs 125 and 127 via network connections (shown but not labeled). CLS 125 is connected to CLS 127 via a network connection (shown but not labeled). In various embodiments, the network connections are bi-directional. In various embodiments, network connections between CLSs 121, 123, 125, and/or 127 may be fiber connections including multiple fiber pairs. In some embodiments, the network connections connecting CLSs along the coast are constructed using a festoon type network. For example, coastal locations are interconnected and provide a diverse choice of routes via land networks.

In some embodiments, offshore switching unit 101 utilizes a branching unit for wavelength routing for subsea optical switching. For example, offshore switching unit 101 may utilize one or more reconfigurable optical add-drop multiplexers (ROADMs) that utilize wavelength selective switching (WSS) components. In addition, offshore switching unit 101 may utilize multi-port ROADMs, such as 1×2, 1×4, 1×9, or more, or cascaded ROADMs of particular degrees. In some embodiments, optical performance monitors are used to report the full spectrum at each port of the ROADM. In addition, conventional optical fiber switches may also be used in conjunction with WSS ROADMs for fiber reconfiguration between the fiber pairs of the submarine cables. In the event of an optical connection failure, an offshore switch unit is able to re-route the connection including performing wavelength routing using a new data communication channel. For example, in the event the data communication channel corresponding to trunk submarine cable 111, offshore switching unit 101, and feeder submarine cable 131 to/from cable landing station (CLS) 121 is severed at feeder submarine cable 131, offshore switching unit 101 is able to route around the failure via another path such as the one corresponding to trunk submarine cable 111, offshore switching unit 101, feeder submarine cable 133, CLS 123, and network connection 141 to/from CLS 121. In various embodiments, offshore switching unit 101 may be used to route around common failures of feeder submarine cables. In some embodiments, offshore switching unit 101 may also be used to route around failures associated with trunk submarine cables. Using the optical branching units, offshore switching unit 101 may utilize wavelength routing to implement subsea optical switching by establishing new data communication channels with alternative submarine cables.

In some embodiments, trunk submarine cables 111, 113, and 115 and feeder submarine cables 131, 133, 135, and 137 are powered from the power feeding equipment (PFE) of onshore landing stations such as cable landing stations (CLSs) 121, 123, 125, and 127. In some embodiments, offshore switching unit 101 and/or CLSs 121, 123, 125, and/or 127 utilize power switching branching units for redirecting power. In some embodiments, the power switching is implemented using a power switched fiber branching unit. Multiple conductor cables with high fiber counts combined with power switching and fiber switching branching units may be used to enable flexible power and optical paths through the network. In some embodiments, the branching units support multiple conductor power switching of any input to any output. In some embodiments, dual power switching and additional power pass through is sufficient. In various embodiments, powering of trunk submarine cables 111, 113, and/or 115 is reconfigurable from any of the landing stations such as CLSs 121, 123, 125, and 127. Using the reconfigurable power switching, CLSs 121, 123, 125, and 127 and/or offshore switching unit 101 may be used to route around power failures. For example, in the event power is reduced or lost along one or more submarine cables such as trunk submarine cable 111 and/or feeder submarine cable 133, power switching branching units can redirect and reestablish a power supply to power the faulty cable(s). In some embodiments, the power is reestablished temporarily until a marine repair can be conducted.

In some embodiments, trunk submarine cables 111, 113, and/or 115 are high performance and high capacity cables that terminate in deep-water locations. By locating trunk submarine cables in deep-water locations, the reliability and availability of the cables is significantly improved as they avoid potential faults caused when located closer to shore. Deep water submarine cables may also be installed in international waters and do not require permits and are not subject to governmental regulation. Fish trawlers, ship anchors, and other causes of faults are more common close to shore and in shallower waters. Examples of trunk submarine cables include cables that traverse across oceans. For example, in some embodiments, land region 129 may represent the east coast of the United States and trunk submarine cables 111, 113, and 115 may each terminate at different off-shore locations such as off the shore near Northern Europe, Southern Europe, and/or South America. In some embodiments, one or more fibers in the trunk submarine cables may connect to a landing station in a conventional fashion while the remaining fibers connect to the branching unit associated with the submarine feeder network.

In some embodiments, the feeder submarine cables such as feeder submarine cables 131, 133, 135, and 137 utilize high fiber pair counts and utilize less expensive cable than the trunk submarine cables such as trunk submarine cables 111, 113, and 115. The feeder submarine cables 131, 133, 135, and 137 connecting offshore switching unit 101 to cable landing stations (CLSs) 121, 123, 125, and 127 may utilize express fiber pairs. In some embodiments, the feeder submarine cables utilize repeaters including less expensive erbium-doped fiber amplifier (EDFA) based repeaters than used by the trunk submarine cables. In some embodiments, the feeder submarine cables utilize different technologies including semiconductor optical amplifiers (SOA), Raman amplifiers, and/or a combination of optical amplifier technologies including EDFA, SOA, and Raman technologies. For example, a 100 nm SOA may be used to transmit both C and L bands within the feeder network, which are then fed into a C+L EDFA-based trunk system.

In some embodiments, the submarine cables such as feeder submarine cables 131, 133, 135, and/or 137 may include two or more conductors. For example, cables with dual conductors may be used in the feeder network to allow for more flexibility in powering multiple ends of a power connection. In some embodiments, trunk submarine cables 111, 113, and/or 115 may include two or more conductors. In various embodiments (not shown), the number of feeder submarine cables exceeds the number of trunk submarine cables in order to account for the relative higher rate of failure associated with the feeder submarine cables. When deploying a feeder network, the number of feeder submarine cables to trunk submarine cables may be determined based on their relative likelihoods of failure.

In some embodiments, the submarine cables such as feeder submarine cables 131, 133, 135, and/or 137 utilize battery-powered repeaters. For example, instead of relying on power sources via a cable landing station, power is supplied via battery-power to reduce the reliance on the conductor. In various embodiments, a remote operated vehicle may be utilized to swap out a battery-powered repeater when it needs to be replaced instead of a more involved mobile repair to a failed conductor. The use of battery-powered repeaters improves the availability of the network and increases flexibility in powering oceanic segments.

In some embodiments, cable landing stations (CLSs) 121, 123, 125, and 127 are each a point or presence (POP) for terminating a feeder submarine cable such as feeder submarine cables 131, 133, 135, and 137. For example, feeder submarine cables connect offshore switching unit 101 to each of CLSs 121, 123, 125, and/or 127. In addition, network connections may connect different CLSs to one another. For example, CLS 121 is connected to CLSs 123 and 125 via two different network connections; CLS 123 is connected to CLSs 121, 125, and 127 via three different network connections; CLS 125 is connected to CLSs 121, 123, and 127 via three different network connections; and CLS 127 is connected to CLSs 123 and 125 via two different network connections. In various embodiments, landing stations such as CLSs 121, 123, 125, and/or 127 may be pre-fabricated to decrease the cost and time required for setting up a new landing station. In various embodiments, CLSs 121, 123, 125, and/or 127 may be interconnected using a festoon-type network layout. In various embodiments, CLSs 121, 123, 125, and/or 127 include power feeding equipment (PFE) for powering optical connections.

In some embodiments, the feeder submarine cables may be connected to permanent or floating offshore platforms (not shown). This configuration may be used to support wireless and/or optical free space wavelength-division multiplexing (WDM) links. In some embodiments, the landing for the feeder submarine cable may be an offshore mini data center either submerged or located on a small island or platform (not shown). The offshore platforms may also be a point of additional power connectivity from alternate energy sources such as solar, wind farms, wave energy conversion, and/or floating battery barges or platforms.

In some embodiments, underwater optical connectors are utilized to connect offshore switching unit 101 with trunk submarine cables 111, 113, and 115 and/or offshore switching unit 101 with feeder submarine cables 131, 133, 135, and 137. For example, underwater optical connectors may be used to connect the feeder network to reduce the cost and decrease the time required to build out the network or change faulty sections.

In some scenarios, different portions of the submarine cable network may be managed and/or maintained by different parties. For example, different portions of the feeder network may be procured from different submarine cable vendors. Similarly, different trunk submarine cables may be procured from different vendors. A variety of vendors may be used to survey, install, and/or maintain the different cables. Different portions of the network architecture may be maintained under different agreements and/or by different parties than the other cables of the network. The two networks may be built at different times according to the schedules associated with permitting of submarine cables. In various scenarios, the disaggregated nature of the submarine cable network promotes the adoption of trans-oceanic systems using an embodiment of the disclosure architecture.

Figure 2:
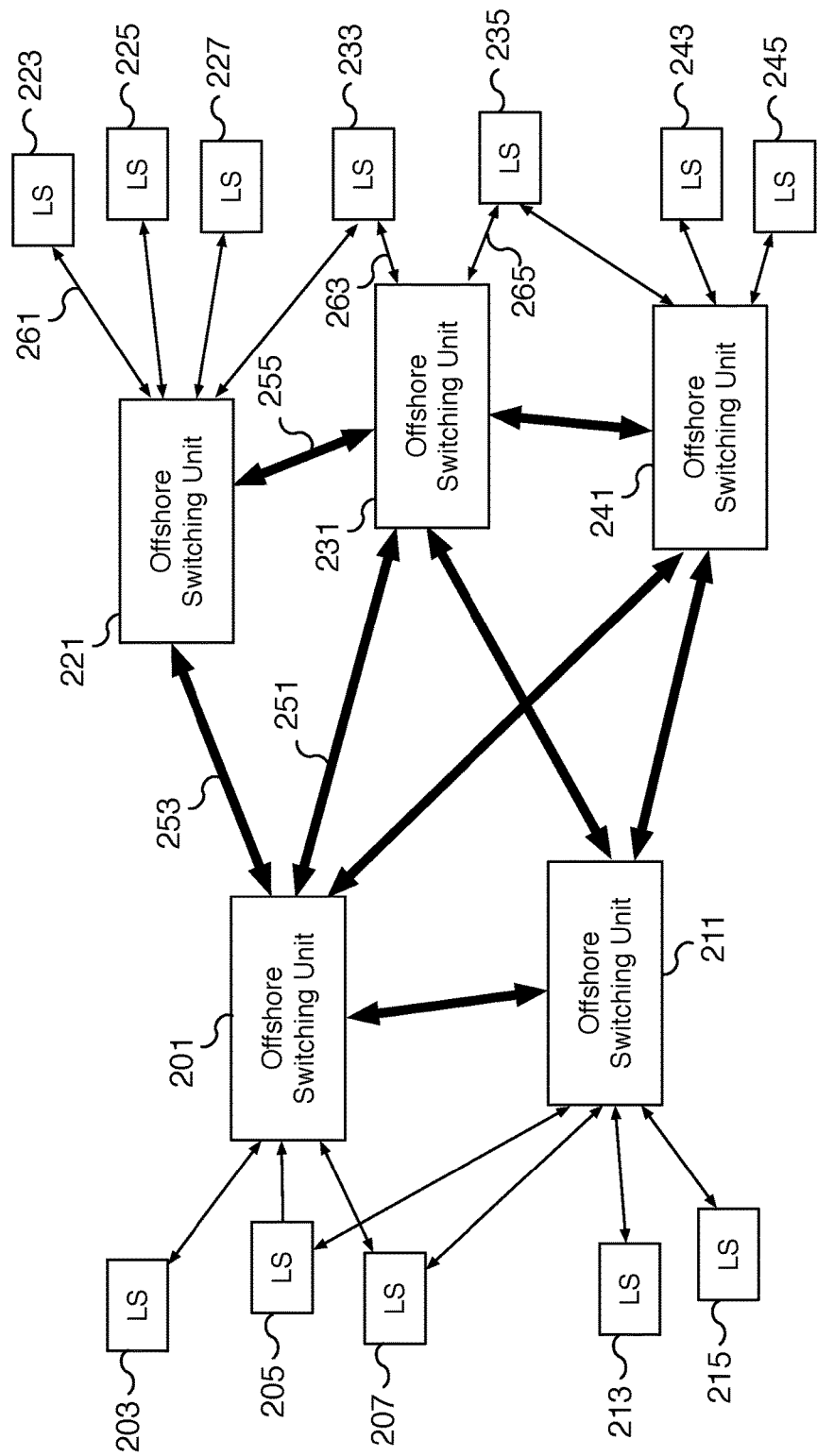
FIG. 2 is a block diagram illustrating an embodiment of a submarine cable network architecture using a disaggregated model.

FIG. 2 is a block diagram illustrating an embodiment of a submarine cable network architecture using a disaggregated model. In the example of FIG. 2, multiple offshore switching units are interconnected via trunk submarine cables and each offshore switching unit is connected to multiple cable landing stations (CLSs) via feeder submarine cables. Using the disclosed architecture, failed or faulty optical and power connections can be detected and new optical channels and/or powering schemes can be established to resolve the detected failures. In the example shown, FIG. 2 includes offshore switching units 201, 211, 221, 231, and 241; cable landing stations (CLSs) 203, 205, 207, 213, 215, 223, 225, 227, 233, 235, 243, and 245; trunk submarine cables 251, 253, and 255; and feeder submarine cables 261, 263 and 265. The various offshore switching units 201, 211, 221, 231, and 241 are connected via trunk submarine cables, which are depicted as the thicker lines with double-sided arrows. Exemplary trunk submarine cables are labeled 251, 253, and 255 among additional trunk submarine cables that are not labeled. In various embodiments, not all the trunk submarine cables as depicted in FIG. 2 are required. For example, an offshore switching unit may have only a single trunk submarine cable connection. Different submarine cable network topologies are possible including ones where the offshore switching units are not each connected to one another. In some embodiments, one or more trunk submarine cables such as trunk submarine cables 251, 253, and/or 255 are unpowered submarine cables. The length of the unpowered submarine cables is designed to allow the cable to carry an optical signal without requiring power. In various embodiments, the unpowered cables are used to route around failed optical connections where sufficient power connectivity exists to send an optical signal over the alternative unpowered cable. The various offshore switching units 201, 211, 221, 231, and 241 are also connected to cable landing stations (CLSs) 203, 205, 207, 213, 215, 223, 225, 227, 233, 235, 243, and 245 as shown via feeder submarine cables, which are depicted as the thinner lines with double-sided arrows. Exemplary feeder submarine cables are labeled 261, 263, and 265 among additional feeder submarine cables that are not labeled. Not shown in FIG. 2 are the network connections between the different CLSs. For example, the different CLSs are connected (directly and/or indirectly) via conventional onshore cable connections such as fiber connections. In some embodiments, the CLS are coastal landing stations connected via a festoon network.

In various embodiments, offshore switching units 201, 211, 221, 231, and 241 are offshore switching units capable of subsea optical switching and power switching as described with respect to offshore switching unit 101 of FIG. 1. Each offshore switching unit 201, 211, 221, 231, and/or 241 may be located offshore from a land region (not shown) and may be connected to other offshore switching units via a one or more trunk submarine cables that cover deep-water portions of the network. In various embodiments, cable landing stations (CLSs) 203, 205, 207, 213, 215, 223, 225, 227, 233, 235, 243, and 245 are located onshore and operate as landing stations as described with respect to CLSs 121, 123, 125, and 127 of FIG. 1. In some embodiments, the trunk submarine cables, such as trunk submarine cables 251, 253, and 255, are trunk submarine cables as described with respect to trunk submarine cables 111, 113, and 115 of FIG. 1. In some embodiments, feeder submarine cables, such as feeder submarine cables 261, 263, and 265, are feeder submarine cables as described with respect to feeder submarine cables 131, 133, 135 and 137 of FIG. 1. Network communications that traverse across an ocean and/or between continents or landmasses may travel over the submarine cable network architecture of FIG. 2. For example, network communication may travel from one cable landing station (e.g., CLS 203) over a feeder submarine cable (not labeled) to an offshore switching unit (e.g., offshore switching unit 201). From one offshore switching unit (e.g., offshore switching unit 201), the network communications travel over a trunk submarine cable (e.g., trunk submarine cable 251) to another offshore switching unit (e.g., offshore switching unit 231). From the destination offshore switching unit (e.g., offshore switching unit 231), the data travels over a feeder submarine cable (e.g., feeder submarine cable 263) to a cable landing station (e.g., CLS 233).

In the example shown, offshore switching unit 201 is connected to offshore switching unit 231 via trunk submarine cable 251; offshore switching unit 201 is connected to offshore switching unit 221 via trunk submarine cable 253; and offshore switching unit 221 is connected to offshore switching unit 231 via trunk submarine cable 255. Offshore switching unit 231 is connected to cable landing station 233 via feeder submarine cable 263 and offshore switching unit 231 is connected to cable landing station 235 via feeder submarine cable 265. Not shown in FIG. 2 is the network of connections that are onshore and communicatively connect cable landing station 233 to cable landing station 235. In the event of an optical or power failure, a new optical channel or powering scheme may be established to route around and/or resolve the failure. For example, in the event trunk submarine cable 251 fails, the optical channel via trunk submarine cable 253, offshore switching unit 221, and trunk submarine cable 255 may replace the connection over trunk submarine cable 251. As another example, in the event feeder submarine cable 263 fails, a data communication channel using the network path through offshore switching unit 231, feeder submarine cable 265, and onshore network connections between CLSs 235 and 233 (not shown) may replace the network connection over feeder submarine cable 263. In various embodiments, in the event of a power failure over feeder submarine cable 263, a power scheme can be switched and established from one of the submarine cables to offshore switching unit 231 such as feeder submarine cable 265 and/or via trunk submarine cable 251. In various embodiments, the additional trunk submarine cables terminating at an offshore switching unit that are not labeled may be used as a power source as well.

In the example of FIG. 2, the diverse choices for connectivity between the various offshore switching units and cable landing stations demonstrate the resilience of the disclosed network to power and optical failures. In various embodiments, by locating the offshore switching units in deeper water, the reliability of the entire network increases and takes advantage of the reliability and network capacity of deep subsea trunk submarine networks. Moreover, by utilizing a variety of less expensive alternatives to construct and/or install feeder submarine cables, the density of alternative feeder submarine cables can be increased. Near-shore faults to a feeder submarine cable can be isolated to the faulty feeder submarine cable and the operational offshore switching unit and trunk submarine network(s) can continue to carry network traffic while routing around the fault using an alternative feeder submarine network for optical connectivity or power.

Figure 3A:
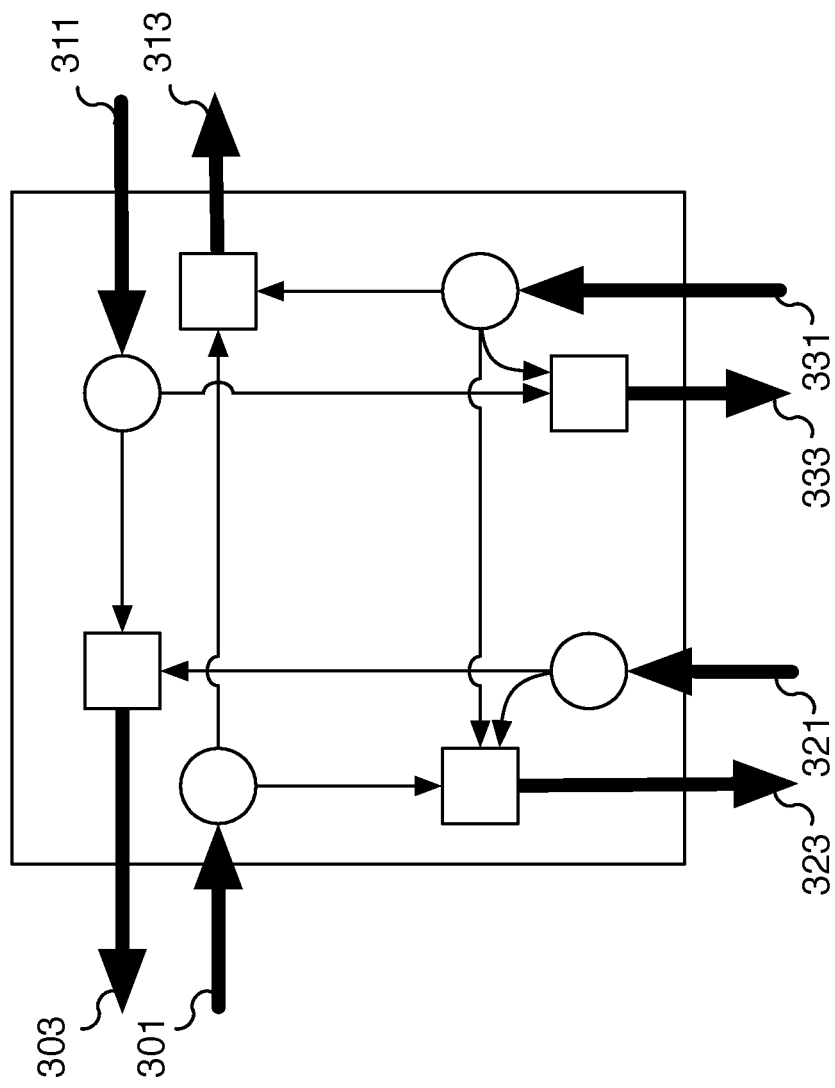
FIG. 3A is a diagram illustrating an exemplary configuration of a reconfigurable optical add-drop multiplexer (ROADM) node for use in a disaggregated submarine cable network architecture.
Figure 3B:
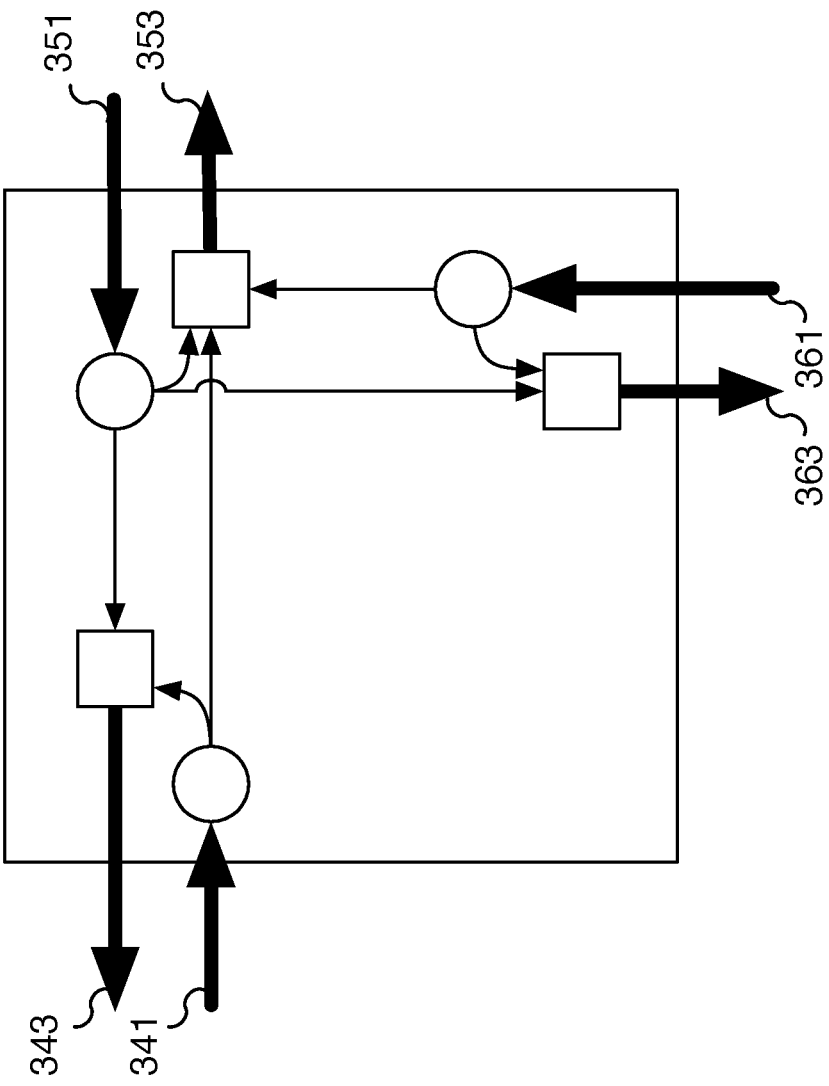
FIG. 3B is a diagram illustrating an exemplary configuration of a reconfigurable optical add-drop multiplexer (ROADM) node for use in a disaggregated submarine cable network architecture.
Figure 3C:
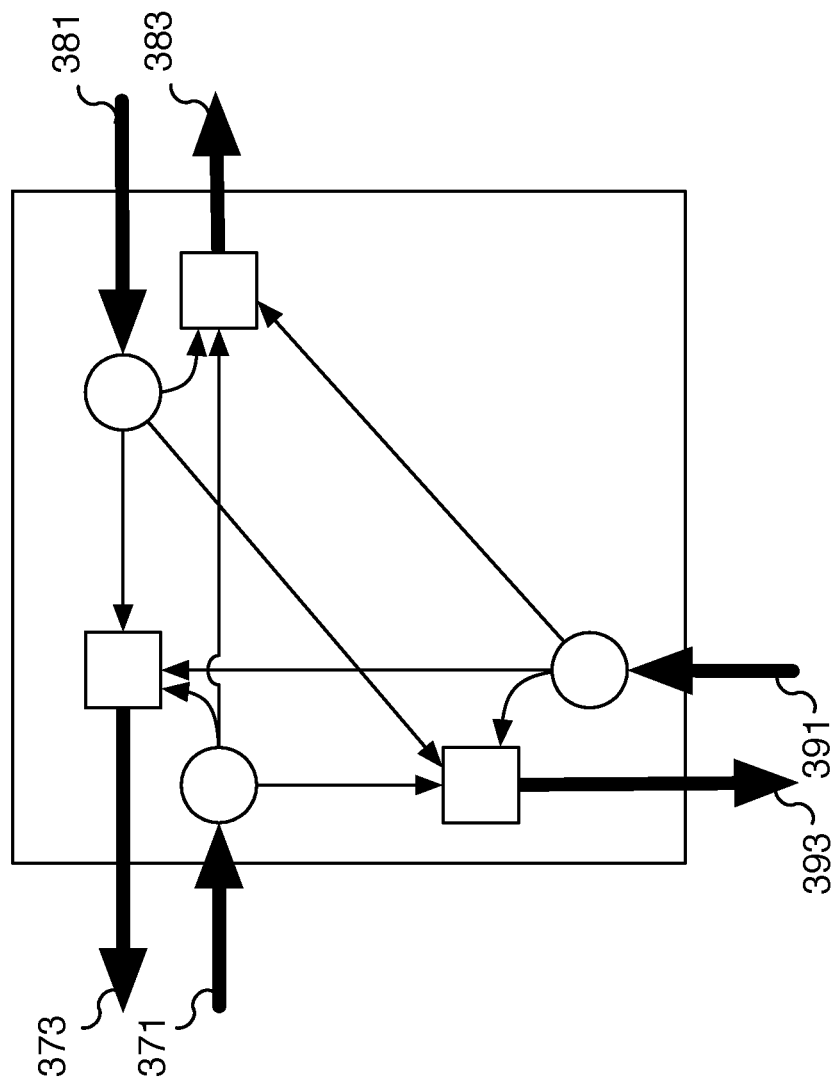
FIG. 3C is a diagram illustrating an exemplary configuration of a reconfigurable optical add-drop multiplexer (ROADM) node for use in a disaggregated submarine cable network architecture.

FIGS. 3A, 3B, and 3C are diagrams illustrating exemplary configurations of reconfigurable optical add-drop multiplexers (ROADMs) for use in a disaggregated submarine cable network architecture. In some embodiments, the configurations of one or more ROADMs make up a ROADM node to which one or more submarine cables may be connected to. Various configurations of ROADMs are possible based on the number of fiber pairs of a trunk or feeder submarine cable connected to the ROADM. In the examples shown, each pair of thick arrows represents an ingress and egress signal pair. In some embodiments, each pair of ingress and egress signals is a fiber pair. In some embodiments, a single strand is used to send in both directions. Ingress signals are connected to an ingress node, represented by a circle. Egress signals exit the ROADM node at an egress node, represented by a square. The thin lines connecting ingress and egress nodes represent network connectivity and a potential path and direction for an incoming signal. In various embodiments, the configurations of FIGS. 3A, 3B, and/or 3C may be utilized by the offshore switching units of FIGS. 1 and/or 2, such as offshore switching unit 101 of FIG. 1 and/or offshore switching units 201, 211, 221, 231, and/or 241 of FIG. 2. In some embodiments, the ROADM node may be used for wavelength selective switching such as switching a data communication channel between different submarine cables including feeder and trunk submarine cables.

FIG. 3A is a diagram illustrating an exemplary configuration of a reconfigurable optical add-drop multiplexer (ROADM) node for use in a disaggregated submarine cable network architecture. In the example shown, the ROADM node is a symmetric configuration and may be used in various embodiments for wavelength routing between a trunk and a branch. FIG. 3A includes ingress signals 301, 311, 321, and 331; and egress signals 303, 313, 323, and 333. Bidirectional communication can be achieved using a pair of ingress and egress signals, such as pairs made up of ingress signal 301 and egress signal 303; ingress signal 311 and egress signal 313; ingress signal 321 and egress signal 323; and ingress signal 331 and egress signal 333. In the configuration shown in FIG. 3A, a signal entering the ROADM node from the left side of the ROADM node can exit the right side or the bottom of the ROADM node. For example, a signal entering via ingress signal 301 can be switched to exit the ROADM node as egress signal 313 or egress signal 323. In some embodiments, a signal entering the ROADM node from the right side of the ROADM node can exit the left side or the bottom of the ROADM node. For example, a signal entering via ingress signal 311 can be switched to exit the ROADM node as egress signal 303 or egress signal 333. In some embodiments, a signal entering the ROADM node from the left bottom of the ROADM node can exit the left side or back out of the left bottom of the ROADM node. For example, a signal entering via ingress signal 321 can be switched to exit the ROADM node as egress signal 303 or egress signal 323. In some embodiments, a signal entering the ROADM node from the right bottom of the ROADM node can exit the right side or back out of the right bottom of the ROADM node. For example, a signal entering via ingress signal 331 can be switched to exit the ROADM node as egress signal 313 or egress signal 333.

FIG. 3B is a diagram illustrating an exemplary configuration of a reconfigurable optical add-drop multiplexer (ROADM) node for use in a disaggregated submarine cable network architecture. In the example shown, the ROADM node is an asymmetric configuration and may be used in some embodiments for wavelength routing between a trunk and a branch. FIG. 3B includes ingress signals 341, 351, and 361; and egress signals 343, 353, and 363. Bidirectional communication can be achieved using a pair of ingress and egress signals, such as pairs made up of ingress signal 341 and egress signal 343; ingress signal 351 and egress signal 353; and ingress signal 361 and egress signal 363. In the configuration shown in FIG. 3B, a signal entering the ROADM node from the left side of the ROADM node can exit the right side or back out of the left side of the ROADM node. For example, a signal entering via ingress signal 341 can be switched to exit the ROADM node as egress signal 353 or egress signal 343. In some embodiments, a signal entering the ROADM node from the right side of the ROADM node can exit the left side or back out of the right side of the ROADM node. For example, a signal entering via ingress signal 351 can be switched to exit the ROADM node as egress signal 343 or egress signal 353. In some embodiments, a signal entering the ROADM node from the bottom of the ROADM node can exit the right side or back out of the bottom of the ROADM node. For example, a signal entering via ingress signal 361 can be switched to exit the ROADM node as egress signal 353 or egress signal 363.

FIG. 3C is a diagram illustrating an exemplary configuration of a reconfigurable optical add-drop multiplexer (ROADM) node for use in a disaggregated submarine cable network architecture. In the example shown, the ROADM node uses a three-degree configuration and may be used in some embodiments for wavelength routing between a trunk and a branch. FIG. 3C includes ingress signals 371, 381, and 391; and egress signals 373, 383, and 393. Bidirectional communication can be achieved using a pair of ingress and egress signals, such as pairs made up of ingress signal 371 and egress signal 373; ingress signal 381 and egress signal 383; and ingress signal 391 and egress signal 393. In the configuration shown in FIG. 3C, a signal entering the ROADM node from the left side of the ROADM node can exit the right side, the bottom, or back out of the left side of the ROADM node. For example, a signal entering via ingress signal 371 can be switched to exit the ROADM node as egress signal 383, egress signal 393, or egress signal 373. In some embodiments, a signal entering the ROADM node from the right side of the ROADM node can exit the left side, the bottom, or back out of the right side of the ROADM node. For example, a signal entering via ingress signal 381 can be switched to exit the ROADM node as egress signal 373, egress signal 393, or egress signal 383. In some embodiments, a signal entering the ROADM node from the bottom of the ROADM node can exit the left side, the right side, or back out of the bottom of the ROADM node. For example, a signal entering via ingress signal 391 can be switched to exit the ROADM node as egress signal 373, egress signal 383, or egress signal 393.

In some embodiments, different degree configurations may be utilized for wavelength selective switching. For example, a three-degree configuration that supports wavelength selective switching (WSS) may be used. In some embodiments, a four-degree (or higher degree) configuration is used to avoid wavelength contention. In some embodiments, different configurations allow for additional numbers of landing stations.

Figure 4:
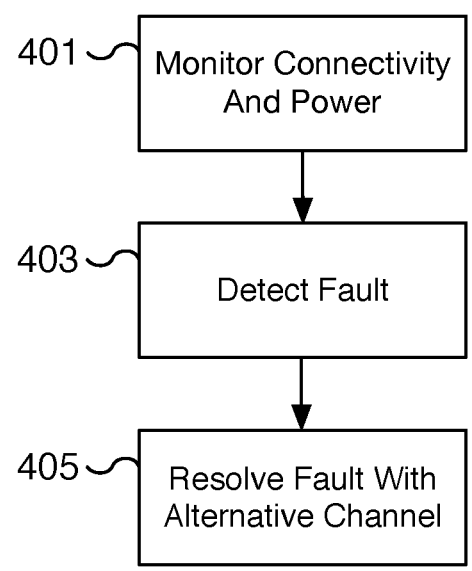
FIG. 4 is a flow diagram illustrating an embodiment of a process for dynamically connecting an alternative channel based on a detected fault.

FIG. 4 is a flow diagram illustrating an embodiment of a process for dynamically connecting an alternative channel based on a detected fault. In some embodiments, the process of FIG. 4 is used by an offshore switching unit to detect and resolve power and optical connectivity issues. In some embodiments, the offshore switching unit is offshore switching unit 101 of FIG. 1 and/or offshore switching units 201, 211, 221, 231, and/or 241 of FIG. 2. In various embodiments, the power and optical connectivity issues detected are related to trunk and/or feeder submarine cables connected to an offshore switching unit.

At 401, optical connectivity and power are monitored. For example, the optical connectivity associated with a network connection is monitored. In various embodiments, the optical connection is a fiber connection. In some embodiments, the optical connectivity includes monitoring a data communication channel, for example, a data communication channel of a trunk and/or feeder submarine cable. In some embodiments, the power monitoring includes detecting a reduction in the availability of power to a feeder and/or trunk submarine cable.

At 403, a fault is detected. For example, a fault is detected in response to a feeder submarine cable being severed and the corresponding optical connection no longer being available. As another example, a fault is detected in the event a reduction is detected in the availability of power from a power supply. In various embodiments, a fault is detected based on the measurement of a power scheme and/or data communication channel exceeding a threshold. For example, in the event the power drops below a threshold, a power fault is detected.

At 405, a fault is resolved with an alternative channel. Based on the fault detected at 403, a corresponding alternative channel is dynamical connected. For example, a new power or data communication channel is dynamically connected using available feeder submarine cables. In some embodiments, the alternative channel utilizes a trunk submarine cable. In some embodiments, the connection is dynamically connected but manually enabled. For example, safety procedures may require that a powering scheme is manually enabled. In some embodiments, the connections are dynamically connected and enabled. For example, in some embodiments, an optical channel may be connected and enabled seamlessly without user intervention.

Figure 5:
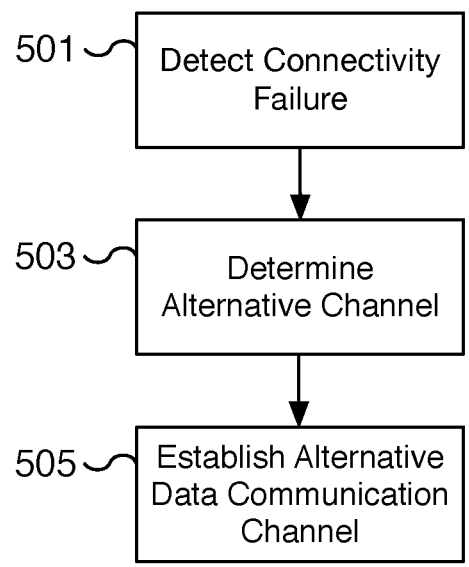
FIG. 5 is a flow diagram illustrating an embodiment of a process for establishing an alternative data communication channel based on a detected connectivity failure.

FIG. 5 is a flow diagram illustrating an embodiment of a process for establishing an alternative data communication channel based on a detected connectivity failure. In some embodiments, the process of FIG. 5 is used by an offshore switching unit to detect and resolve optical connectivity issues. For example, a submarine cable may be severed and results in a data communication channel established over the cable failing. The process of FIG. 5 may be used to establish an alternative data communication channel for reestablishing network connectivity. In some embodiments, the offshore switching unit is offshore switching unit 101 of FIG. 1 and/or offshore switching units 201, 211, 221, 231, and/or 241 of FIG. 2. In various embodiments, the optical connectivity issues detected are related to trunk and/or feeder submarine cables connected to an offshore switching unit.

In some embodiments, the process of FIG. 5 is used to dynamically connect a data communication channel of a selected feeder submarine cable among a plurality of feeder submarine cables with a data communication channel of the trunk submarine cable. In some embodiments, the new connection is based at least in response to a detected reduction in availability of one or more data communication channels of the plurality of feeder submarine cables. In some embodiments, step 501 is performed at 401 and/or 403 of FIG. 4, step 503 is performed at 405 of FIG. 4, and/or step 505 is performed at 405 of FIG. 4.

At 501, a connectivity failure is detected. For example, the optical connectivity of a data communication channel is monitored and in the event a connectivity failure occurs, the failure is detected. For example, a failure may be detected in the event a submarine cable is severed and the corresponding optical connection fails. In some scenarios, the failure is the result of a faulty fiber cable. In various embodiments, the failure is detected by comparing a measurement of the connectivity with a threshold value. In the event the threshold value exceeds an appropriate reliability metric, a failure is detected. In some embodiments, the failure detection mechanism is part of an offshore switching unit.

At 503, an alternative channel is determined. For example, a new data communication channel is determined based on the failed channel. In some embodiments, the new channel is based on one or more different submarine cables. For example, a new channel may be determined based on a different feeder submarine cable connected to an offshore switching unit and the new connection may reach shore via a different cable landing station (CLS). From the CLS, conventional onshore communications networks may be utilized. In some embodiments, a handshake and/or setup protocol is performed to determine the validity of the alternative channel. In some embodiments, one or more alternative channels are determined and ranked to then select an appropriate alternative channel.

At 505, an alternative data communication channel is established. For example, the alternative channel determined at 503 is established. In some embodiments, the channel is dynamically connected. For example, using wavelength selective switching (WSS), a bi-directional signal is switched from the failed channel to the new channel. In some embodiments, no user intervention is required to switch channels. In various embodiments, the WSS components are part of an offshore switching unit. In some embodiments, the new channel is established over an alternative feeder submarine cable that terminates at a different cable landing station (CLS) from the failed feeder submarine cable. From the new CLS, conventional onshore communications networks may be utilized to connect the data communication channel to the intended end/start point.

Figure 6:
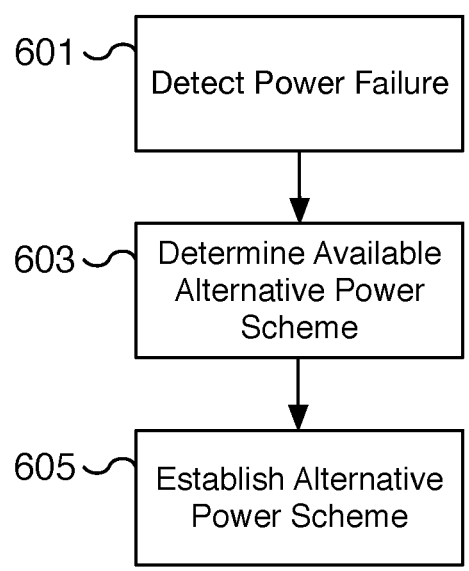
FIG. 6 is a flow diagram illustrating an embodiment of a process for establishing an alternative powering scheme based on a detected power conductor failure.

FIG. 6 is a flow diagram illustrating an embodiment of a process for establishing an alternative powering scheme based on a detected power conductor failure. In some embodiments, the process of FIG. 6 is used by an offshore switching unit to detect and resolve power availability issues. For example, the power to a submarine cable may be reduced or severed resulting in insufficient power to power a repeater needed to carry a data signal over a data communication channel. The process of FIG. 6 may be used to establish an alternative powering scheme for reestablishing the power for a cable needed for network connectivity. In some embodiments, the offshore switching unit is offshore switching unit 101 of FIG. 1 and/or offshore switching units 201, 211, 221, 231, and/or 241 of FIG. 2. In various embodiments, the power availability issues detected are related to trunk and/or feeder submarine cables connected to an offshore switching unit.

In some embodiments, the process of FIG. 6 is used to dynamically redistribute power to a selected feeder submarine cable among a plurality of feeder submarine cables with a corresponding continuation in the powering of the trunk submarine cable. In some embodiments, the new connection is based at least in response to a detected reduction in availability of power within the plurality of feeder submarine cables. In some embodiments, step 601 is performed at 401 and/or 403 of FIG. 4, step 603 is performed at 405 of FIG. 4, and/or step 605 is performed at 405 of FIG. 4.

At 601, a power failure is detected. For example, the power availability of a power scheme is monitored and in the event a power failure occurs, the failure is detected. In some embodiments, the failure corresponds to a severed submarine cable. In some embodiments, the failure is the result of a faulty power line associated with a submarine cable or a failed repeater and/or optical amplifier. In various embodiments, the failure is detected by comparing a measurement of the power available with a threshold value. In the event the threshold value exceeds an appropriate reliability metric, a failure is detected. For example, in some embodiments, a reduction in the power availability by a threshold amount results in the detection of a power failure. In some embodiments, the failure detection mechanism is part of an offshore switching unit.

At 603, an alternative powering scheme is determined. For example, a new powering scheme is determined to restore connectivity in response to the failure. In some embodiments, the new scheme is based on one or more different submarine cables and availability of alternative power sources. For example, a new powering scheme may be determined using a different distribution of power within a feeder submarine cable. In some embodiments, a confirmation with the cable landing station (CLS) of the alternative powering configuration of the feeder submarine cable is established to determine the alternative powering scheme. For example, the availability and power demands of the power feeding equipment (PFE) associated with a CLS and submarine cable(s) are confirmed prior to determining the alternative powering scheme. In some embodiments, one or more different powering schemes are compared to determine the optimal alternative powering scheme. For example, a powering scheme with the least load may be determined as the alternative powering scheme. In some embodiments, the cheaper source of power is utilized. In some embodiments, the powering scheme is determined based on the parties maintaining and/or running the different CLSs. For example, the CLSs may be prioritized to help determine an alternative powering scheme. In some embodiments, the alternative powering scheme is a temporary solution to the failure until the fault can be fixed, for example, by repairing or replacing the failed networking hardware.

At 605, an alternative powering scheme is established. For example, the alternative scheme determined at 603 is established. In some embodiments, the channel is dynamically connected. For example, using one or more power switch branching units, power is switched to facilitate the recovery of a failed power conductor. In some embodiments, no user intervention is required to switch channels. In some embodiments, a user must manually enable the switching of the powering scheme. For example, a user may be required to manually switch the power due to the high voltage requirements of the utilized submarine cables. In various embodiments, the power switch branching components are part of an offshore switching unit.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a trunk submarine cable;
   an offshore switching unit connected to the trunk submarine cable; and
   a plurality of feeder submarine cables connected to the offshore switching unit, wherein the offshore switching unit is configured to dynamically connect a data communication channel of a selected feeder submarine cable among the plurality of feeder submarine cables with a data communication channel of the trunk submarine cable based at least in response to a detected reduction in availability of one or more data communication channels of the plurality of feeder submarine cables.

2. The system of claim 1, wherein the offshore switching unit is configured to dynamically switch to a new power scheme using at least the selected feeder submarine cable among the plurality of feeder submarine cables to power the trunk submarine cable.

3. The system of claim 2, wherein the offshore switching unit is configured to dynamically switch to a new power scheme using at least the selected feeder submarine cable among the plurality of feeder submarine cables to power the trunk submarine cable based at least in response to a detected reduction in availability of power within the plurality of feeder submarine cables.

4. The system of claim 1, wherein the offshore switching unit includes a wavelength selective switch component for dynamically connecting the data communication channel of the selected feeder submarine cable.

5. The system of claim 1, wherein the offshore switching unit includes a power switch branching component for dynamically redistributing power.

6. The system of claim 1, wherein the offshore switching unit and a terminal end of the trunk submarine cable is positioned in international waters.

7. The system of claim 1, wherein the plurality of feeder submarine cables connect the offshore switching unit to a plurality of cable landing stations.

8. The system of claim 7, wherein at least one of the plurality of feeder submarine cables includes an additional conductor for diverting power to a power fault.

9. The system of claim 7, wherein the plurality of cable landing stations are connected via a festoon network.

10. The system of claim 1, wherein the trunk submarine cable is a trans-oceanic submarine cable.

11. The system of claim 1, wherein the trunk submarine cable is connected to a second offshore switching unit.

12. The system of claim 1, wherein the trunk submarine cable includes strands of optical fibers, a water-resistant gel, and a polyethylene exterior moisture barrier.

13. The system of claim 1, wherein the trunk submarine cable includes strands of optical fibers, and the strands of optical fibers are enclosed by a metal tube and surrounded by strands of steel wires.

14. The system of claim 1, wherein the plurality of feeder submarine cables connected to the offshore switching unit includes at least three feeder submarine cables.

15. A method, comprising:
    monitoring a status of a channel associated with an offshore switching unit connected to a trunk submarine cable, wherein a plurality of feeder submarine cables are connected to the offshore switching unit;
    detecting a reduction in availability of one or more data communication channels of the plurality of feeder submarine cables; and
    dynamically connecting a data communication channel of a selected feeder submarine cable among the plurality of feeder submarine cables with a data communication channel of the trunk submarine cable based at least in response to the detected reduction in availability of the one or more data communication channels of the plurality of feeder submarine cables.

16. The method of claim 15, wherein the reduction in availability includes an optical connectivity fault or a power fault.

17. The method of claim 16, wherein the reduction in availability is detected including by comparing a measured value of the one or more data communication channels to a threshold value.

18. The method of claim 16, wherein the reduction in availability is detected including by comparing a measured value of a power scheme to a threshold value.

19. A method, comprising:
    connecting a first feeder submarine cable to an offshore switching unit;
    connecting a second feeder submarine cable to the offshore switching unit;
    connecting a first trunk submarine cable to the offshore switching unit;
    monitoring a status of a data communication channel associated using the offshore switching unit, the first feeder submarine cable, and the first trunk submarine cable;
    detecting a reduction in availability of the data communication channel of the first feeder submarine cable; and
    dynamically connecting a data communication channel of the second feeder submarine cable with a data communication channel of the trunk submarine cable based at least in response to the detected reduction in availability of the data communication channel of the first feeder submarine cable.

20. The method of claim 15, wherein the offshore switching unit is configured to dynamically switch to a new power scheme using at least the selected feeder submarine cable among the plurality of feeder submarine cables to power the trunk submarine cable.

* * * * *